Jan. 7, 1936.　　　H. A. GEHRES　　　2,027,035
WRIST PIN BEARING CONSTRUCTION
Filed Jan. 23, 1930
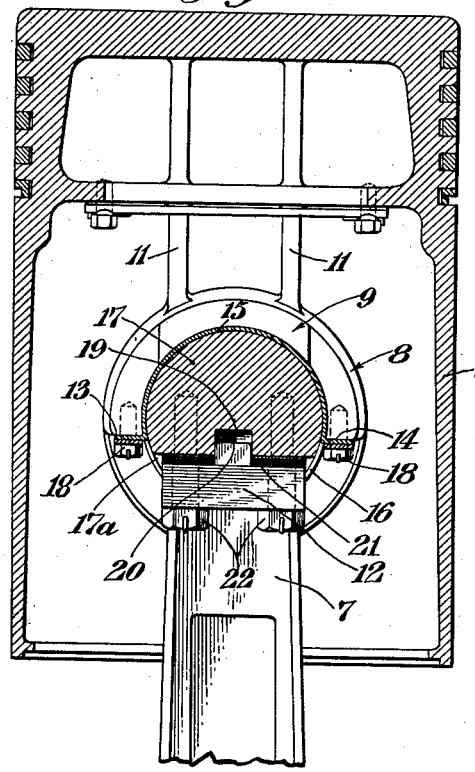
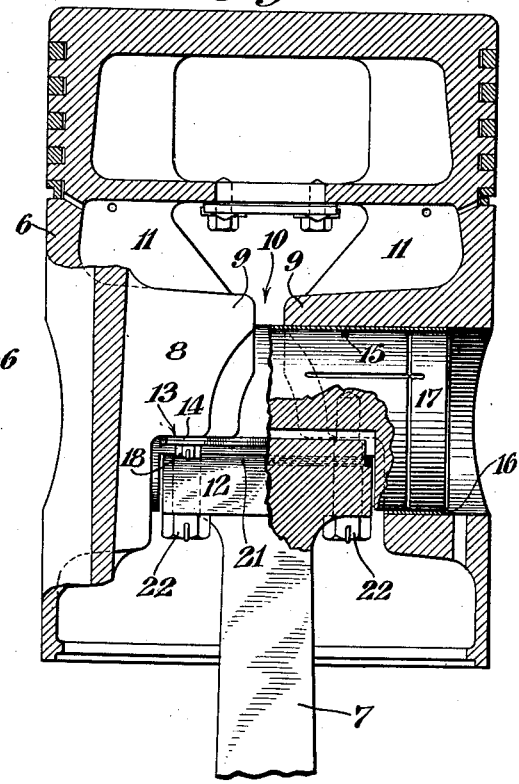
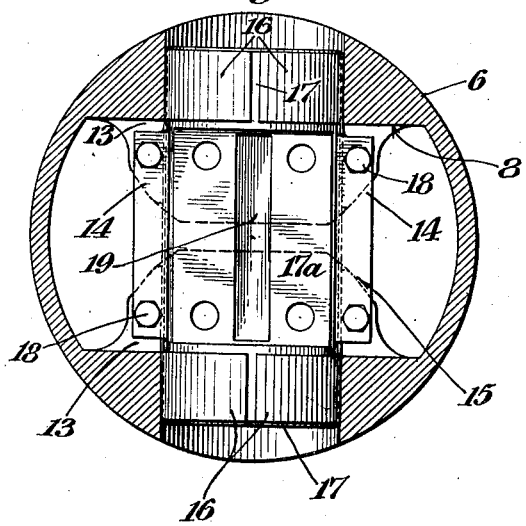
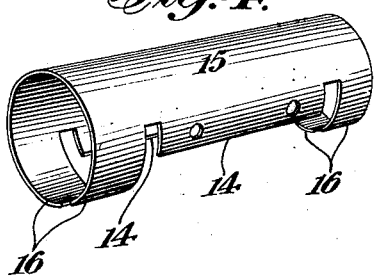
INVENTOR
Hewitt A. Gehres
BY
Ward Crosby & Neal
ATTORNEYS Patented Jan. 7, 1936

2,027,035

UNITED STATES PATENT OFFICE 2,027,035

WRIST PIN BEARING CONSTRUCTION

Hewitt A. Gehres, Mount Vernon, Ohio, assignor to Cooper-Bessemer Corporation, Mount Vernon, Ohio, a corporation of Ohio Application January 23, 1930, Serial No. 422,733

5 Claims. (Cl. 309—19)

This invention relates to wrist pins and bushing constructions.

Among the objects of this invention is the construction of a wrist pin connection which permits of the use of a wrist pin whose bearing surface can be machined at one operation, which can be readily assembled in the hubs of the piston and readily connected to the connecting rod by a connection which permits shimming between the rod and pin.

Another object is the provision of hubs or bearings on the piston of relatively great length and area on the pressure side of the pin, which are spaced to permit of expansion radially inwardly to prevent the piston walls from being pushed out, which together constitute a substantially continuous backing for a bushing, and which are provided with means for securely holding the bushing in position.

Still other objects will be apparent from the following description taken in connection with the drawing in which—

Fig. 1 is a longitudinal central section through the piston taken transversely of the wrist pin;

Fig. 2 is a view partly in section at right angles to the view in Fig. 1;

Fig. 3 is a transverse horizontal section showing the lower sides of the bushing and wrist pin; and Fig. 4 is a perspective view of the bushing.

The invention is shown in connection with a piston 6 and crank arm 7. The wrist pin bearings of this invention comprise opposed hubs 8 extending inwardly from the walls of the piston with their upper or pressure side portions 9 and having their inner ends spaced only a short distance from each other as indicated at 10. The portions 9 are preferably braced by webs 11 which may be arranged in pairs as shown in Fig. 1. This construction affords substantialy full bearing area on the pressure side of the pin, and yet if the bearing should heat up and expand the hubs, the expansion will be taken up between the inner ends of the hubs, instead of pushing the walls of the piston outwardly as would be the case with a continuous bearing.

The lower portions of the hubs are shorter than the upper or pressure portions, their inner ends being spaced a greater distance from each other to allow the head 12 of the connecting rod 7 to be received between them. The edges 13 of the inwardly projecting hub portions 9 are machined as at 13 to form seats for outwardly turned ends or flaps 14 of a sheet bushing 15.

The bushing 15 is preferably stamped out of sheet material and rolled into the form shown in Fig. 4. The bushing is assembled with the piston by sliding the bushing longitudinally through the hubs until the flaps 14 are alined with the seats 13 on the hubs. In this position the split ends 16 of the bushing are located within the outer ends of the hubs. The wrist pin 17 is then inserted endwise into the bushing after which the portions 14 are bent over the seats 13 and secured in position by washer plates and bolts 18. After preliminary assembly, the wrist pin 17 may be withdrawn and any high spots in the bushing then scraped down.

The wrist pin 17 is of cylindrical form and of the same diameter throughout, and for purposes of connection with the head 12 it is cut away as at 17a to provide a flat seat for the connecting rod head 12, and is recessed at 19 to receive a tongue 20 on the head 12.

This connection between the wrist pin and head 12 permits of the use of a wrist pin of which the whole bearing area may be machined at one operation. It also permits of casting the hubs integral with the piston. Preferably shimming may also be afforded by the use of shims 21 of the general rectangular form of the head 12 and cut away centrally to accommodate the tongue 20 of the head. The head 12, shims and wrist pin are preferably secured together by bolts 22 as shown.

The advantages of this construction are the provision of long bearing portions for the wrist pin on the pressure side of the pin to obtain a substantially continuous bearing while avoiding the objectionable tendency of a fully continuous bearing to push out the sides of the piston during expansion, the use of a one piece sheet bushing which may be readily effectively secured in place and which is readily removable, and the use of a wrist pin of which the bearing surfaces are cylindrical and parts of the same cylindrical surface and which is recessed to connect with the connecting rod-head, thereby permitting the hubs to be cast integrally with the piston and providing for a firm connection between the connecting rod and pin, and allowing for the convenient use of shims at this point.

While the invention has been described in connection with the specific embodiment disclosed, it is to be understood that this has been done for purposes of disclosure only and that this is not to be construed as a limitation as it is obvious that changes may be made without departing from the spirit and scope of this invention.

I claim:

1. A piston having opposed wrist pin hubs projecting inwardly from the inner walls of the piston, the inner ends of the pressure sides of said hubs being slightly spaced, and the inner ends of the remaining sides of said hubs being spaced a greater distance to afford room for the head of the connecting rod to be interposed therebetween, the side edge of at least one of said first mentioned inner hub ends forming a seat for a wrist pin bushing.

2. A piston having opposed wrist pin hubs projecting inwardly from the inner walls of the piston, the inner ends of the pressure sides of said hubs being slightly spaced a greater distance to afford room for the head of the connecting rod to be interposed therebetween, and a sheet bushing within said hubs and having at least one portion bent out to hold the bushing in place.

3. In a piston for internal combustion engines, the combination of a cylindrical piston pin, a cross-bore in the piston structure forming a bearing box for the pin, a bushing in said bore, said box and bushing having openings formed in their bottom sides which openings are spaced equal distances from both ends of the box, and said pin having a bearing along its top surface against said bushing and also having equal bearing against the two bottom end parts of said bushing, the said pin being rebated to provide an attachment face entirely within the cylindrical contour of the piston pin, permitting the pin to be inserted endwise into said bore, a connecting rod having a flanged head, means for securing said head to said pin after the latter has been inserted in said box, comprising bolts passing through the flange on said connecting rod and threaded into the rebated attachment face in the piston pin, the bolts extending within said bottom opening in the box and being accessible therethrough from within the piston skirt.

4. In combination, a piston having wrist pin bearing structure providing a transverse bore, a generally cylindrical wrist pin insertable into said bore, said bearing structure providing substantially full bearing area on the pressure side of said wrist pin and having relatively widely spaced portions encircling and in bearing engagement with the opposite ends of the wrist pin on its remaining side, said wrist pin having on its remaining side and entirely within its cylindrical contour, a seat interposed between said widely spaced portions of the bearing structure, a connecting rod having a flanged head engaging said seat, and means for securing said head to said pin after the latter has been inserted into said bore comprising bolts passing through said head and into said seat for securing the connecting rod to the wrist pin, said bolts being located between said spaced portions of the bearing structure and being accessible from within the piston skirt.

5. In combination, a piston having wrist pin bearing structure providing a transverse bore, a generally cylindrical wrist pin insertable into said bore, said bearing structure providing substantially full bearing area on the pressure side of said wrist pin and having relatively widely spaced portions encircling and in bearing engagement with the opposite ends of the wrist pin on its remaining side, the bearing walls of said bearing structure on the pressure side of the wrist pin having a relatively small transverse gap associated therewith, affording transverse expansibility of said walls independently of the adjacent outer walls of the piston, said wrist pin having on its remaining side and entirely within its cylindrical contour, a seat interposed between said widely spaced portions of the bearing structure, a connecting rod having a flanged head engaging said seat, and means for securing said head to said pin after the latter has been inserted into said bore comprising bolts passing through said head and into said seat for securing the connecting rod to the wrist pin, said bolts being located between said spaced portions of the bearing structure and being accessible from within the piston skirt.

HEWITT A. GEHRES.